US010814272B2

United States Patent
Stuart et al.

(10) Patent No.: US 10,814,272 B2
(45) Date of Patent: Oct. 27, 2020

(54) FLUE GAS DESULFURIZATION SYSTEM AND METHOD FOR PERFORMING FLUE GAS DESULFURIZATION

(71) Applicant: CHEMTREAT, INC., Glen Allen, VA (US)

(72) Inventors: Dale P Stuart, Glen Allen, VA (US); Rajendra Prasad Kalakodimi, Glen Allen, VA (US); David N Karlovich, St. Augustine, FL (US); Curtis Seebaran, Tampa, FL (US); Douglas G Brown, Treasure Island, FL (US)

(73) Assignee: CHEMTREAT, INC., Glen Allen, VA (US)

( * ) Notice: Subject to any disclaimer, the term of this patent is extended or adjusted under 35 U.S.C. 154(b) by 0 days.

(21) Appl. No.: 16/796,335

(22) Filed: Feb. 20, 2020

(65) Prior Publication Data
US 2020/0188848 A1 Jun. 18, 2020

Related U.S. Application Data

(63) Continuation of application No. PCT/US2019/034623, filed on May 30, 2019.

(60) Provisional application No. 62/677,810, filed on May 30, 2018.

(51) Int. Cl.
*B01D 53/50* (2006.01)
*B01D 53/78* (2006.01)
*B01D 53/80* (2006.01)

(52) U.S. Cl.
CPC ........... *B01D 53/78* (2013.01); *B01D 53/502* (2013.01); *B01D 53/80* (2013.01); *B01D 2251/608* (2013.01); *B01D 2258/0283* (2013.01)

(58) Field of Classification Search
CPC .......... B01D 53/1481; B01D 53/501; B01D 53/502; B01D 53/78; B01D 53/79; B01D 2257/302; B01D 2257/602; B01D 2258/0283
See application file for complete search history.

(56) References Cited

U.S. PATENT DOCUMENTS

| 2,021,548 A | 11/1935 | Goodeve |
| 3,632,306 A | 1/1972 | Villiers-Fisher et al. |
| 3,914,378 A | 10/1975 | Selmeczi |

(Continued)

FOREIGN PATENT DOCUMENTS

DE 2 913 867 A1 * 10/1908 ............. B01D 53/68

OTHER PUBLICATIONS

Aug. 16, 2019 International Search Report issued in International Patent Application No. PCT/US19/34623.

(Continued)

*Primary Examiner* — Timothy C Vanoy
(74) *Attorney, Agent, or Firm* — Oliff PLC

(57) ABSTRACT

A flue gas desulfurization (FGD) system in which a buffering additive feed directly adds a buffering additive containing acetic acid to either the FGD sump or a stream of the system that is downstream of the sump. In a method for performing flue gas desulfurization, the buffering additive, containing acetic acid, is added to either the sump or the overflow. That is, the buffering additive is added to the FGD system separately from the alkaline feed slurry, which contains lime or limestone.

14 Claims, 5 Drawing Sheets

(56) References Cited

U.S. PATENT DOCUMENTS

| | | | | |
|---|---|---|---|---|
| 3,928,537 | A * | 12/1975 | Saitoh | B01D 53/501 423/242.3 |
| 4,367,205 | A * | 1/1983 | Kudo | B01D 53/501 423/243.03 |
| 4,615,871 | A | 10/1986 | Yoon | |
| 4,670,224 | A | 6/1987 | Stehning et al. | |
| 5,034,204 | A | 7/1991 | Moser et al. | |
| 5,202,103 | A | 4/1993 | Chang et al. | |
| 5,520,897 | A | 5/1996 | Rogers et al. | |
| 5,558,848 | A | 9/1996 | Moser et al. | |
| 5,733,517 | A * | 3/1998 | Owens | B01D 53/502 423/242.3 |
| 10,124,290 | B2 * | 11/2018 | Denny | B01D 53/78 |
| 2005/0244319 | A1 | 11/2005 | Hurley | |
| 2017/0050191 | A1 | 2/2017 | Kramer | |

OTHER PUBLICATIONS

Aug. 16, 2019 Written Opinion of the International Searching Authority issued in International Patent Application No. PCT/US19/34623.

Rochelle et al., "Buffer Additives for Lime/Limestone Slurry Scrubbing Synthesis, Mass Transfer, and Degradation", EPA Project Summary EPA-600/S7-84-052, May 1984.

Mobley et al., "Recent Advances in Commercial Organic-Acid-Enhanced FGD Systems", Presentation at the Pittsburgh Coal Technology Conference, (Sep. 17, 1984-Sep. 21, 1984).

Blythe et al., "Investigation of Mercury Control by Wet FGD Systems", Jun. 2001.

Richardson, M. "Effects of MATS Control and Variable Unit Load on ORP and Trace Metals in FGD Wastewater", 2016 APC—Wastewater Round Table & Expo Presentation (Jul. 18-19, 2016).

INVISTA DBA Dibasic Acid for Flue Gas Desulfurization, INVISTA, Nov. 17, 2010.

\* cited by examiner

FLUE GAS DESULFURIZATION SYSTEM AND METHOD FOR PERFORMING FLUE GAS DESULFURIZATION

CROSS REFERENCE TO RELATED APPLICATIONS

This is a Continuation of PCT/US2019/034623 filed May 30, 2019, which claims the benefit of U.S. Provisional Application No. 62/677,810 filed May 30, 2018. The disclosure of the prior applications is hereby incorporated by reference herein in its entirety.

BACKGROUND

Coal burning power plants are the source of a significant amount of power within the power grid. However, the exhaust or flue gas created from burning coal contains several environmentally toxic chemicals, and thus the emissions must be treated in order to mitigate the environmental impact of burning coal.

One of the most toxic elements generated from burning coal is sulfur dioxide. A typical flue gas stream contains from 500 to 1,000 ppm of sulfur dioxide. Sulfur dioxide can be removed from the gaseous combustion products by chemical reaction in a process known as wet scrubbing. In this approach, a solution or suspension of reagent both enters and leaves a flue gas contacting zone within a flue gas desulfurization (FGD) system in the liquid state.

The FGD system directs flue gas through a series of plates in an absorber and sprays an alkaline reactant concurrent to the flue gas flow. The sprayed droplets hit the plates and distribute the alkaline reactant into the flue gas. The alkaline reactant reacts with the sulfur dioxide to produce a slurry impregnated with sulfates. This slurry eventually falls to the FGD reaction tank and forms the sump, and from there can be further processed and recycled.

Sodium hydroxide, lime, limestone, barium hydroxide, potassium hydroxide, and potassium carbonate (e.g., in the form of potash) can be used to generate alkalinity in the alkaline reactant in order to convert sulfur dioxide to sulfurous and/or sulfuric acid and their neutralized species. To minimize scale build-up and maximize the capture of sulfur dioxide, the operating pH of the FGD system (the pH of the sump) is controlled to be between 4.5 and 6.0.

Nonetheless, the removal of sulfur dioxide in an FGD system is limited because the alkalinity maintained in the FGD system is quickly depleted as the alkaline reactant that is sprayed into the flue gas forms sulfurous and/or sulfuric acid upon reacting with the sulfur dioxide, and the acid diffuses into the water droplet. This results in a temporary depletion of the dissolved alkaline compound at the droplet interface. The acid is eventually neutralized by dissolution of solid alkali in the inner part of the water droplet and/or the bulk slurry solution within the alkaline reactant. However, the initial drop in pH at the surface of the water droplet decreases the efficiency of the FGD system by up to 15% because the lower pH causes sulfur dioxide diffusion to decrease, and the non-dissolved (solid) alkaline compound is not immediately available to react.

To maintain the operating pH at desirable levels, a concentrated alkaline slurry—an alkaline feed slurry—is added to the sump to restore alkalinity before the components of the sump are recycled back into the absorber. However, it is not desirable to simply add more alkaline feed slurry to combat the drop in pH at the surface of the water droplet, because the higher pH would lead to scale build-up. One solution is to buffer the system in order to maintain efficiency without causing scale formation.

Weak acids can be useful for buffering. At the FGD system operating pH (4.5 to 6.0), weak acids will be neutralized. When sulfur dioxide diffuses into the water droplet, the neutralized acid gives up its associated alkali, providing an instant pH boost. This counteracts the pH drop that would otherwise occur at the surface of the water droplet.

The buffering additive, e.g. containing a weak acid, is typically introduced to the FGD system together with the alkaline feed slurry. The buffering additive will complex with the alkaline compound when added to the alkaline feed slurry, and this complexing will delay the additive's ability to react as a buffer. Additionally, coupling administration of the alkaline feed slurry and the buffering additive makes it more difficult to fine-tune the pH of the system. Current buffering techniques suffer from these drawbacks.

SUMMARY

The disclosed embodiments include a flue gas desulfurization (FGD) system in which a buffering additive feed directly adds a buffering additive containing acetic acid to either the FGD sump or a stream of the system that is downstream of the sump. The disclosed embodiments also include methods for performing flue gas desulfurization in which the buffering additive, containing acetic acid, is added to either the sump or the overflow. By adding the buffering additive (containing acetic acid) separately from the alkaline feed slurry, more acetic acid is available in the bulk water for buffering. The acetic acid also inhibits mercury re-emission.

DETAILED DESCRIPTION OF EMBODIMENTS

Described herein are a system and method of flue gas desulfurization. In the disclosed system and method, alkalinity within the FGD system can be more efficiently controlled. The system and method have the added benefit of providing mercury control.

FGD System and Method

Figure 1:
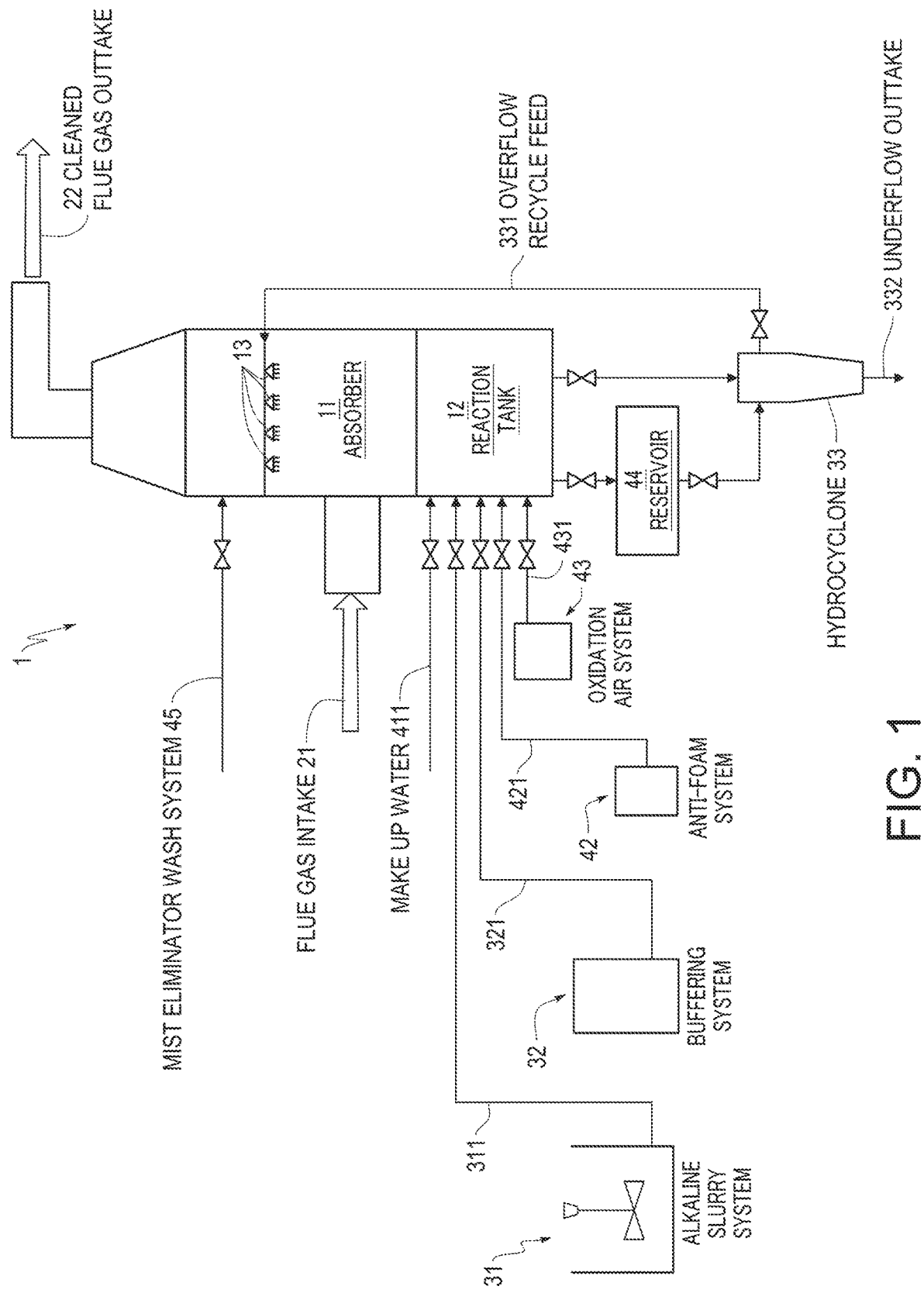
FIG. 1 shows an embodiment of the flue gas desulfurization system.

An FGD system 1, as shown in FIG. 1, includes an absorber 11, a flue gas intake 21 that delivers flue gas to the absorber 11, a reaction tank 12 into which the sump accumulates, an alkaline slurry feed 311, a buffering additive feed 321, a hydrocyclone 33, and a cleaned flue gas outtake 22 that expels cleaned (desulfurized) flue gas from the absorber 11.

An alkaline reactant is introduced into the absorber 11 through a series of shower heads 13. Defined herein, an "alkaline" substance is a substance having a pH of 7.1 or greater. The alkaline reactant contains an alkaline compound in water, typically in the form of a slurry. An "alkaline compound" is a compound which provides an alkaline solution (a solution having a pH of 7.1 or greater) when present in the solution at moderate concentrations (over $10^{-3}$ M). The shower heads 13 spray the alkaline reactant in a direction concurrent to the flue gas flow. The sprayed droplets distribute alkaline reactant into the flue gas, reacting the alkaline reactant with the flue gas. The reacted slurry falls to the reaction tank 12 and forms the sump.

The alkaline slurry feed 311 delivers the alkaline feed slurry to the reaction tank 12 for mixing with the sump. The alkaline feed slurry contains an alkaline compound in water. As described later, unreacted alkaline compound from the alkaline feed slurry is recycled back into the absorber 11 and is included in the alkaline reactant. Thus, the alkaline compound in the alkaline feed slurry is the same as the alkaline compound in the alkaline reactant. However, the alkaline compound is included in the alkaline feed slurry at a higher concentration.

The alkaline slurry feed 311 controls delivery of the alkaline feed slurry to the reaction tank 12 in order to maintain an FGD operating pH of between 4.5 and 6.0 and to ensure that there is sufficient alkaline compound present in the recycled alkaline reactant to scrub the flue gas of sulfur dioxide. The alkaline slurry feed 311 pumps the alkaline feed slurry from an alkaline slurry source into the reaction tank. For example, as shown in FIG. 1, the alkaline slurry source can be an alkaline slurry system 31 that generates the alkaline feed slurry on-site by mixing the alkaline compound into water. The alkaline feed slurry can be generated on-site continuously or as needed (e.g., when the operating pH reaches a certain threshold, or after a predetermined lapse of time). Alternatively, the alkaline feed slurry can be prepared in advance, outside the FGD system 1, and introduced to the alkaline slurry feed 311 when needed. The alkaline feed slurry can also be prepared on-site and stored in the alkaline slurry system 31 until needed.

The buffering additive feed 321 delivers a buffering additive to the FGD system. The buffering additive includes a buffering compound dissolved in water. A "buffering compound" is a compound (e.g. weak acid or alkali) which, in solution, resists changes in pH when an acid or alkali is added to the solution.

As with the alkaline feed slurry, the buffering additive can be generated on-site continuously or as needed in a buffering system 32. Alternatively, the buffering additive can be prepared in advance, outside the FGD system 1, and introduced to the buffering additive feed 321 when needed. The buffering additive can also be prepared on-site and stored in the buffering system 32 until needed. The buffering additive feed 321 can add more buffering additive to the system in response to an automated signal from the system 1 based on a threshold level of sulfur dioxide or mercury detected in the flue gas intake 21 or cleaned flue gas outtake 22.

In an embodiment shown in FIG. 1, the buffering additive is added directly to the sump in the reaction tank 12 via the buffering additive feed 321, separate from the alkaline slurry feed 311. In this regard, because there is no intermixing of the alkaline feed slurry and the buffering additive before being added to the reaction tank 12, the buffering additive does not react with alkaline feed slurry prior to being mixed with the sump. However, the disclosed embodiments are not limited to this configuration. The buffering additive can also be introduced to other components of the FGD system 1 downstream of the reaction tank 12.

The FGD system 1 can optionally include a reservoir 44 that collects the sump from the reaction tank 12 for later processing, including separation and any additional dewatering steps.

The FGD system includes a hydrocyclone 33. The sump exits the reaction tank 12 (and the reservoir 44, if present) and proceeds to the hydrocyclone 33. The hydrocyclone 33 separates large solids (underflow) from liquid and fine solids (overflow) using centrifugal force. The average particle size (volume mean diameter) in the underflow can be from 25 to 80 μm, from 30 to 75 μm, or from 35 to 60 μm. The average particle size in the overflow is from 1 to 25 μm, from 1 to 20 μm, or from 1 to 10 μm. The overflow (containing unreacted alkaline compound) is recycled back into the absorber 11 for further reaction via the overflow recycle feed 331. In other words, the overflow is supplied as at least part of the alkaline reactant. The underflow exits the system via the underflow outtake 332 and can be further processed, if desired.

As discussed above, the buffering additive can also be introduced to other components of the FGD system 1 downstream of the reaction tank 12. In particular, the buffering additive feed 321 can instead deliver the buffering additive directly to the overflow recycle feed 331. In general, the buffering additive feed 321 can add the buffering additive to any stream of the system that is downstream of the sump and before the overflow recycle feed 331, or any other recycle feed, enters the absorber.

The FGD system can include other components to further improve the performance of the system. For example, the system can include an anti-foam system 42 that introduces an anti-foaming agent into the sump via an anti-foaming agent feed 421 in order to reduce foaming in the sump. Additionally, make up water can be added to the sump via a make up water feed 411 to prevent the sump from drying out. The system can also include an oxidation air system 43 that introduces oxygen via an oxidation air feed 431 into the sump to promote conversion of sulfites to sulfates. In particular, oxidation can be employed when the alkaline feed slurry is based on limestone or lime in order to produce gypsum. The gypsum can be used to produce fertilizer, plaster, or wallboard, among other things, and its formation can minimize scale build-up by removing the sulfates and sulfites from the bulk.

Also, to prevent contamination of the cleaned flue gas as it exits the system 1 via the cleaned flue gas outtake 22, the FGD system 1 can include a mist eliminator wash system 45 that removes any mist droplets (particularly sulfuric acid mist) still present in the vapor stream.

Alkaline Feed Slurry

The alkaline feed slurry can include 10 to 44 wt % of the alkaline compound mixed with water. For example, the alkaline feed slurry can include 15 to 45 wt %, or 20 to 40 wt % of the alkaline compound. Often, the alkaline feed slurry includes 20 wt % of the alkaline compound.

The alkaline feed slurry is higher in solids content than both the sump and the hydrocyclone overflow; however, the sump and hydrocyclone overflow are not free of solids. The sump can contain 2 to 12 wt %, 5 to 10 wt %, or 6 to 8 wt % of solids, for example. The hydrocyclone overflow can contain 0.1 to 10 wt %, 0.5 to 5 wt %, or 1 to 3 wt % of solids.

The alkaline compound can include, for example, sodium hydroxide (caustic soda), lime, limestone, barium hydroxide, potassium hydroxide, potassium carbonate (e.g., potash), or combinations thereof. For example, the alkaline reactant is a solution of lime (CaO) or limestone ($CaCO_3$) in water.

When lime or limestone is used, the compounds react with sulfurous acid (generated as the sulfur dioxide contacts the water in the alkaline reactant) to generate calcium sulfite ($CaSO_3$). In the reaction, the flue gas contacts the alkaline reactant spray, which results in the diffusion of sulfur dioxide through the sprayed droplet (comprising predominantly water). The pH of the droplet drops and sulfurous/sulfuric acid forms in the droplet. Carbonic acid forms from the lime or limestone, and any carbon dioxide diffuses to the atmosphere, freeing the calcium to associate with the sulfite/sulfate (or bisulfite/sulfate). Once the droplet falls to the sump, it is outside of the gas path. Thus, there is no significant diffusion of sulfur dioxide in the sump. The pH of the droplet is generally kept high enough to absorb the maximum amount of sulfur dioxide prior to hitting the sump. In this case, the pH will not drop to a point that would limit sulfur dioxide diffusion, and all sulfuric acid will be converted to a calcium sulfite/sulfate species.

The reaction scheme for limestone is summarized below.

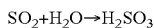

$$SO_2 + H_2O \rightarrow H_2SO_3$$

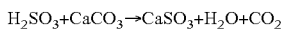

$$H_2SO_3 + CaCO_3 \rightarrow CaSO_3 + H_2O + CO_2$$

And the reaction scheme for lime is as follows.

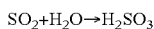

$$SO_2 + H_2O \rightarrow H_2SO_3$$

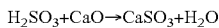

$$H_2SO_3 + CaO \rightarrow CaSO_3 + H_2O$$

The calcium sulfite can be further reacted via oxidation to produce gypsum ($CaSO_4 \cdot 2H_2O$) according to the following reaction scheme.

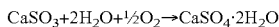

$$CaSO_3 + 2H_2O + \tfrac{1}{2}O_2 \rightarrow CaSO_4 \cdot 2H_2O$$

As the reaction progresses, the lime or limestone is consumed, and the operating pH decreases. More alkaline feed slurry can then be introduced to the sump in order to maintain the operating pH within the desired range (e.g., 4.5 to 6.0).

Buffering Additive

The buffering compound can be an organic acid. In the disclosed embodiments, at least a fraction of the buffering compound is acetic acid ($CH_3COOH$). For example, acetic acid comprises at least 60 wt %, 70 wt %, 80 wt %, 90 wt %, 95 wt %, or 99 wt % of the buffering compound present in the buffering additive.

The buffering additive can include 100% organic acids or can be mixed with water, e.g., so that water comprises 10 to 95 wt %, 50 to 90 wt %, or 75 to 85 wt % of the buffering additive. In one embodiment, the buffering additive is glacial acetic acid.

Acetic acid has a pKa of 4.74, and buffers effectively when present in an FGD system operating in the pH range of 4.5 to 6.0. Although acetic acid contains only a single acid group, its concentration of acid groups per molecular weight (1 group/60.05 g/mol) is higher than other organic acids. Acetic acid is therefore a stronger acid with increased buffering capacity relative to other organic acids (e.g., adipic acid, formic acid, lactic acid). Acetic acid also has a relatively low molecular weight, meaning that it can diffuse more quickly.

Figure 2:
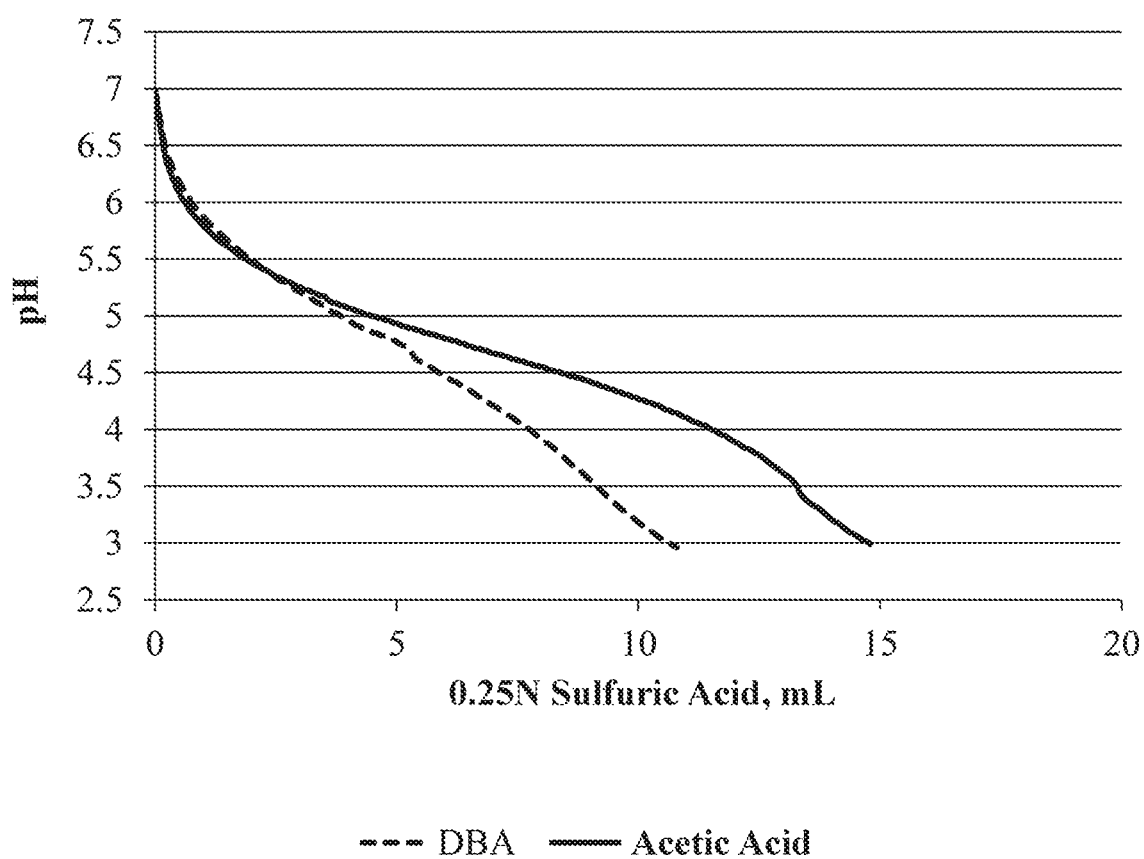
FIG. 2 is a graph showing the buffering capacity of acetic acid.

FIG. 2 charts the buffering capacity of acetic acid compared to dibasic acid (DBA) in a 0.25N sulfuric acid solution. DBA is conventionally used as a buffering compound in FGD systems. It is generally obtained as a waste stream from nylon manufacturing, and is mainly comprised of adipic acid. DBA also includes other small dibasic acids, mainly glucaric and succinic acids. As shown, acetic acid has a higher buffering capacity compared to DBA within the operating pH range of 4.5 to 6.0.

Traditionally DBA and other buffering additives are added directly to the alkaline feed slurry. However, acetic acid shows surprisingly enhanced buffering ability and other advantages when it is added to the FGD system separately from the alkaline feed slurry because acetic acid has a low reactivity toward calcium sulfate and calcium sulfite, and is therefore more readily available to buffer the system when added separately.

Due to the enhanced buffering capacity achieved by adding the acetic acid separately from the alkaline feed slurry, the dissolved alkaline compound can immediately react with sulfur dioxide at the surface of the sprayed water droplet. This reduces the need to add more alkaline compound to the sump. When less alkaline compound is used, operating costs are reduced because there is less consumption of the alkaline compound. Additionally, less circulating alkaline reactant is required to capture sulfur dioxide at any given operating load, thus lowering the liquid-to-gas ratio in the FGD system and reducing water consumption.

Because less water is circulated through the FGD system, there is a lower electrical demand on system pumps and fans, and there is less volume of waste requiring further treatment. For example, the FGD system could use four recycle pumps rather than five, or run three out of five pumps for up two days, while still maintaining sulfur dioxide levels well under the compliance limit. This could provide a 3 MW load reduction from operating the pumps and ID fan, saving approximately $734,400. The decreased pump and fan usage could also reduce maintenance costs (including costs due to outages during maintenance). Thus, the same degree of sulfur dioxide removal can be accomplished at reduced operating costs.

Furthermore, because there is less demand for the alkaline compound (because it is used more efficiently), less alkaline feed slurry is needed to maintain the scrubbing capacity. For example, the amount of alkaline compound (e.g., limestone) used can be reduced by 10 to 20%, saving approximately $3,500 per day.

If less alkaline feed slurry is introduced into the system, the sump can be maintained at a lower operating pH, reducing or preventing scale build-up. For example, the operating pH can be lowered from 5.5 to 5.0, without reducing the scrubbing efficiency, when acetic acid is introduced separately from the alkaline feed slurry.

Also, the improved scrubbing capacity enables increased sulfur dioxide removal without adjusting operating loads. In other words, more sulfur dioxide can be removed from the flue gas without adjusting other parameters (such as introducing more alkaline feed slurry). The improved scrubbing capacity therefore allows for use of higher sulfur coal or coal blends while remaining compliant with guidelines for sulfur dioxide removal. Additionally, where gypsum is produced, the increased scrubbing capacity leads to increased gypsum production.

As evidenced by the trial results shown in Table 1 below, these improvements in buffering capacity (and the other secondary improvements) are not achieved when a different buffering additive such as DBA is added to the FGD system separately from the alkaline feed slurry.

In the trial, acetic acid and DBA were introduced directly to the sump (separately from the alkaline slurry feed) at the beginning of the trial (0 hours) in a slug dose on an equivalent actives basis, and all other FGD parameters were maintained constant. In particular, the sump pH (5.85), sump volume, and make up water feed rate were all held constant throughout the course of the 40-hour trial. The sulfur dioxide content in the cleaned flue gas outtake was measured every two hours. Lime was used as the alkaline compound.

TABLE 1

| hours after addition of buffering additive | SO$_2$ content in cleaned flue gas outtake (ppm) | |
|---|---|---|
| | acetic acid | DBA |
| 2 | 180.8 | 478.2 |
| 12 | 213.1 | 331.4 |
| 24 | 271.2 | 438.5 |
| 36 | 219.3 | 486.9 |
| 40 | 219.3 | 537.2 |

When either buffering additive was used, the amount of sulfur dioxide present in the cleaned flue gas outtake was reduced compared to if no buffering additive had been introduced to the system. Without a buffering additive, the sulfur dioxide content in the cleaned flue gas outtake was approximately 600 ppm. However, the effect of using acetic acid, when added separately from the lime slurry feed, was unexpectedly more dramatic when compared to using DBA.

When acetic acid was added, the amount of sulfur dioxide in the cleaned flue gas outtake quickly dropped and remained low throughout the duration of the trial, reflecting an enhanced buffering effect and thus improved scrubbing. As summarized in Table 2, acetic acid provided a larger initial reduction in sulfur dioxide (24% more relative to DBA), and exhibited a lengthy residence time (47 hours) in the system that extended beyond the length of the trial period.

By contrast, DBA provided a smaller initial reduction in sulfur dioxide, and a residence time of only 39 hours (as evidenced by the increase in measured sulfur dioxide content between 36 and 40 hours).

TABLE 2

| | acetic acid | DBA |
|---|---|---|
| active material (lbs) | 4,170 | 3,951 |
| cost to add (raw material) | $4,021 (49% increase) | $2,690 |
| initial SO$_2$ reduction | 67% (24% increase) | 54% |
| product residence time (hours) | 47 (20% increase) | 39 |
| lime slurry flow rate (gpm) | 215 (16% decrease) | 255 |

Thus, the retention time for acetic acid was 20% longer than with DBA. Its stronger buffering capacity allows for more precise control of the sulfur dioxide content and lime slurry feed.

As a result of the improved buffering efficiency of acetic acid when added separately from the lime slurry feed, less lime slurry (and thus a slower lime slurry flow rate) was needed to maintain the sump pH compared to when using DBA in the same manner and on an equivalent actives basis. Although the raw material cost of acetic acid was greater than the cost of DBA, the process resulted in a net savings due to the reduced amount of lime slurry consumed. Extrapolated over the course of one year, for example, the raw material costs for acetic acid would be about $46,130 more than for DBA, but using acetic acid as the buffering additive would save about $979,200 in lime costs. This would result in a net savings of about $933,070 per year. In fact, even greater savings could be achieved by using less acetic acid, because current regulations do not require that the flue gas be scrubbed to the extent accomplished in this trial. In other words, higher levels of sulfur dioxide in the cleaned flue gas outtake might be considered acceptable.

Figure 3:
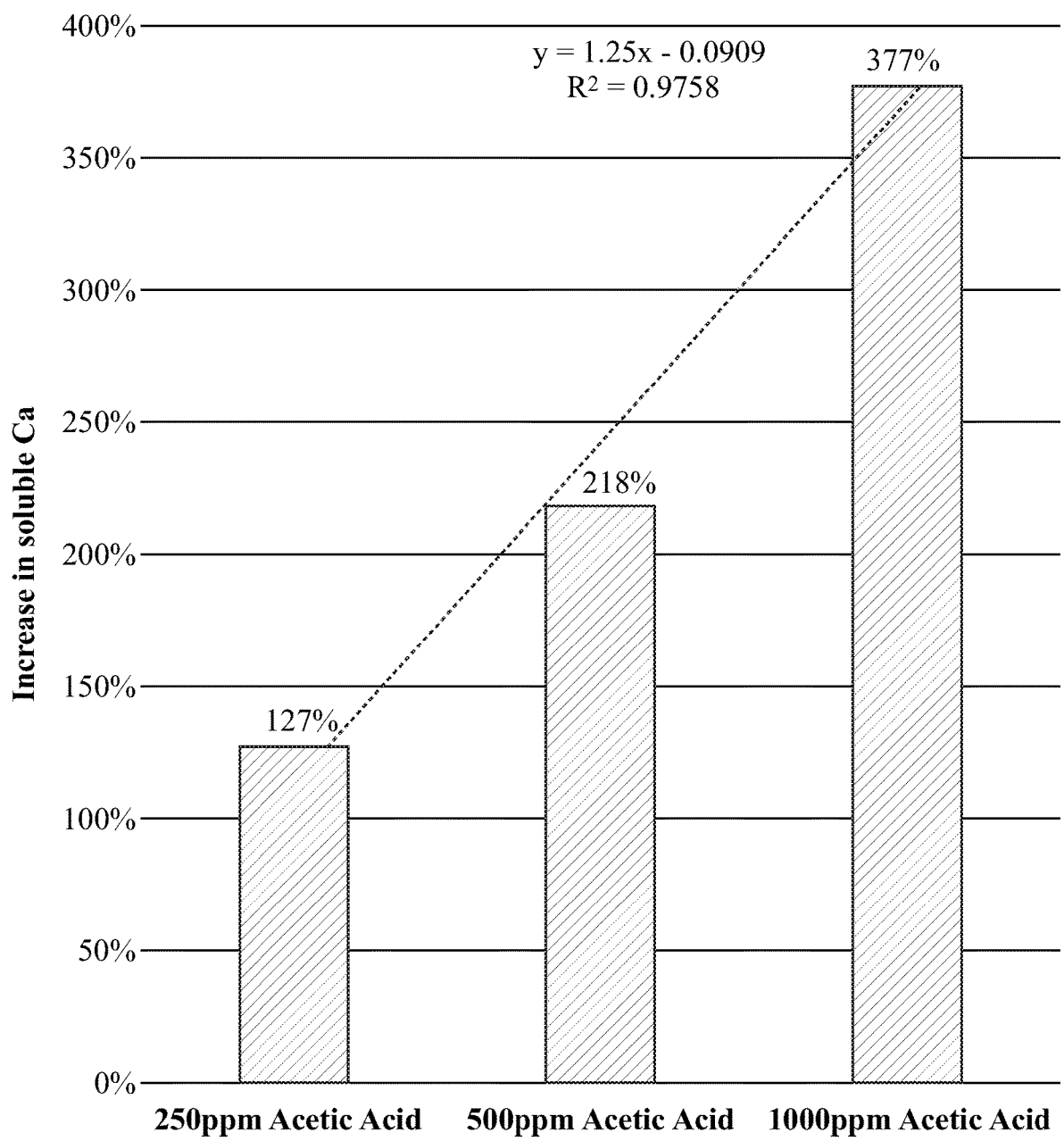
FIG. 3 is a graph showing the high reactivity of acetic acid with limestone (calcite).

The same degree of buffering capacity is not accomplished when acetic acid is introduced together with the alkaline slurry feed (e.g., a lime slurry feed). As shown in FIG. 3, acetic acid readily complexes with the calcium in limestone (calcite). As more acetic acid (ranging from 250 ppm to 1,000 ppm) was added to 1,500 ppm of the calcite solution, more dissolved calcium was detected. In particular, FIG. 3 charts the relative increase in soluble calcium relative to a 1,500 ppm calcite solution that was not treated with acetic acid. The amounts of soluble calcium measured for each solution are set forth in Table 3 below.

TABLE 3

| amount acetic acid (ppm) | amount soluble calcium (ppm) | change in soluble calcium (%) |
|---|---|---|
| 0 | 9.2 | — |
| 250 | 21.0 | 127 |
| 500 | 29.4 | 218 |
| 1,000 | 44.1 | 377 |

This demonstrates that acetic acid will readily react with calcium in a limestone solution. The same complexing occurs when acetic acid is added to lime solutions.

While the increased solubility of calcium improves the availability of calcium, the complexing of acetic acid with the calcium inhibits the acetic acid from acting as a buffer. Without intending to be bound by theory, it is believed that the positive charge density of calcium (due to its 2$^+$ charge and small ionic radius) attracts the acetic acid and limits its ability to act as a buffer due to the reduced mobility of ions in the solution. This is likely a kinetic related phenomenon as the acetic acid has only one charged group and is labile; therefore, the acetic acid would not be held by the calcium.

Figure 4:
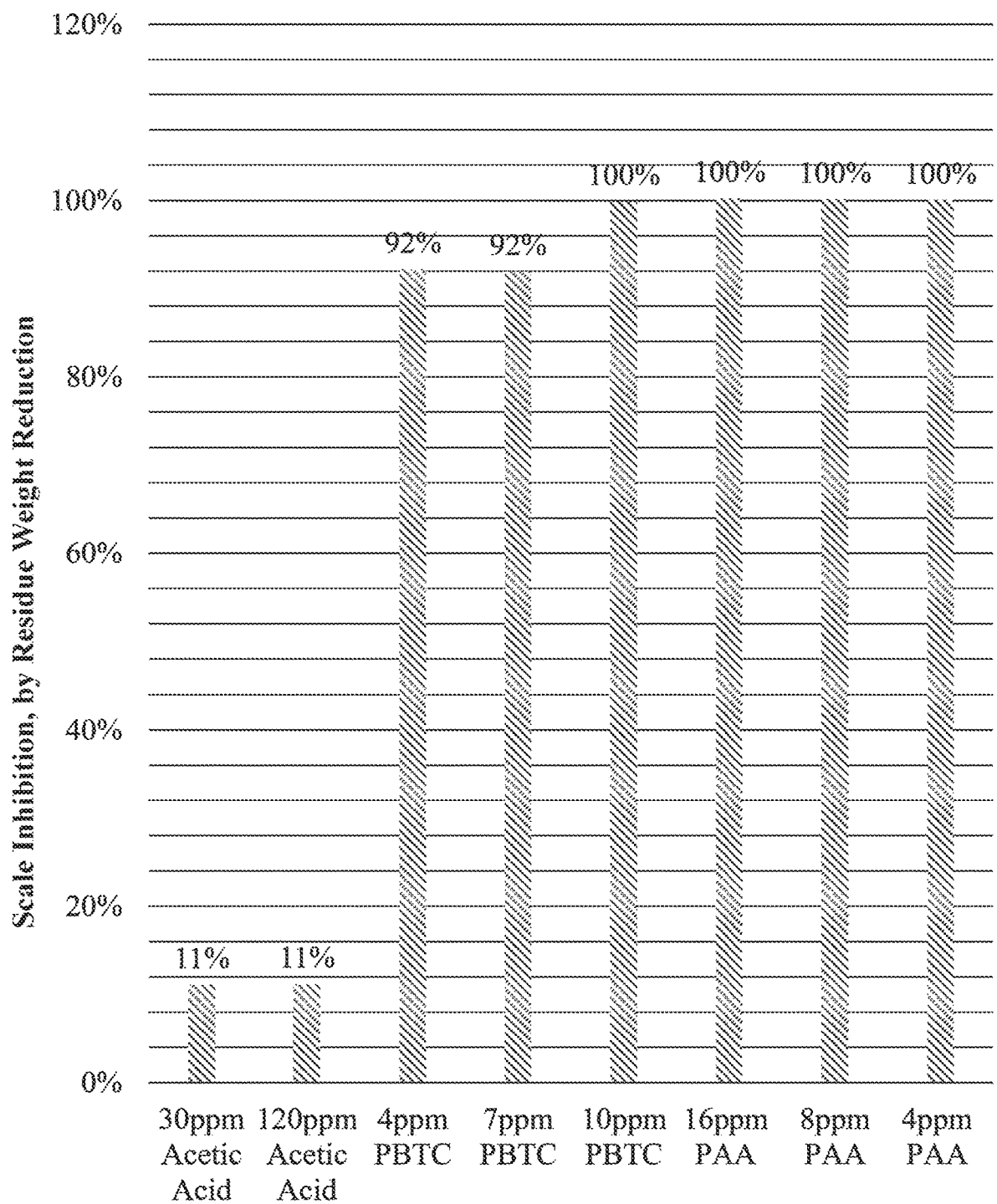
FIG. 4 is a graph showing the low reactivity of acetic acid with calcium sulfate.

By contrast, acetic acid has a low reactivity toward calcium sulfate. FIG. 4 charts the ability of acetic acid to inhibit scale formation as compared to commonly used scale inhibitors (phosphonobutane tricarboxylic acid (PBTC) and peracetic acid (PAA)). Scale inhibition was determined by measuring residue weight in a solution containing $CaCl_2$ and $Na_2SO_4$. The test substance (e.g., acetic acid) was added to the solution containing 10,800 ppm $CaCl_2*2H_2O$ (0.073 mol) and 10,400 ppm $Na_2SO_4$, anhydrous (0.073 mol), the solution was maintained at 50° C. for 24 hours, and then the solution was filtered. The residue (scale formation) was weighed, and the residue weight was compared to that of a control system in which no test substance was added.

Addition of acetic acid, even at levels as high as 120 ppm, had minimal impact on scale formation. Specifically, acetic acid provided only 11% scale inhibition when added, and no detectable changes were observed as more acetic acid was added. This demonstrates that acetic acid reacts poorly with calcium sulfate present in the reacted slurry. Acetic acid also reacts poorly with calcium sulfite. On the other hand, PBTC and PAA provided predictable scale inhibition at concentrations as low as 4 ppm. Both PBTC and PAA completely prevented scale formation when introduced to the solution at 10 ppm.

In the disclosed embodiments, the buffering additive is added to the FGD system separately from the alkaline feed slurry, increasing the effectiveness of the buffering additive. As discussed above, the buffering additive can be added directly to the sump or downstream of the reaction tank but before re-entering the absorber. In this regard, the buffering additive can be added directly to the sump, directly to a reservoir or tank that collects the sump, or directly to the overflow recycle feed. In some embodiments, no buffering additive is added directly to the alkaline feed slurry.

The solids content in the sump and overflow is usually less than one-third limestone with the remainder being calcium sulfite or calcium sulfate. As demonstrated in FIGS. 3 and 4, acetic acid reacts very slowly with calcium sulfite and calcium sulfate, but rapidly with limestone. Thus, by adding the buffering additive (containing acetic acid) to the sump or overflow instead of with the alkaline feed slurry, more acetic acid is available in the bulk water for buffering. In this regard, if acetic acid were added to the alkaline feed slurry, which has solids that are mostly lime or limestone, for example, it would immediately react with and break down the lime or limestone and thus would not be available in the scrubbing reaction to perform its buffering function.

The acetic acid also advantageously promotes mercury removal from the flue gas. During combustion of pulverized coals, most of the mercury in the coal volatilizes and is present in the flue gas in oxidized form. The oxidized mercury solubilizes in the alkaline reactant sprayed in the absorber. However, mercury re-emission can occur when soluble $Hg^{2+}$ reacts via various mechanisms in the sump and is reduced to insoluble Hg. Once reduced, the mercury can vaporize, re-entering the gas phase as elemental mercury. The elemental mercury thus passes with the flue gas leaving the FGD system, and then passes through the stack.

Depending on the operating conditions of the FGD system (e.g., the oxidation/reduction potential and the composition of the alkaline compound), re-emissions can amount to up to 50% of the FGD inlet oxidized mercury. However, acetic acid complexes with mercury to form mercury acetate, sequestering the oxidized mercury before it can be reduced to the elemental form and re-emitted. The sequestered oxidized mercury is then solubilized in the alkaline reactant, remaining in the slurry, and does not re-enter the gas stream.

Figure 5:
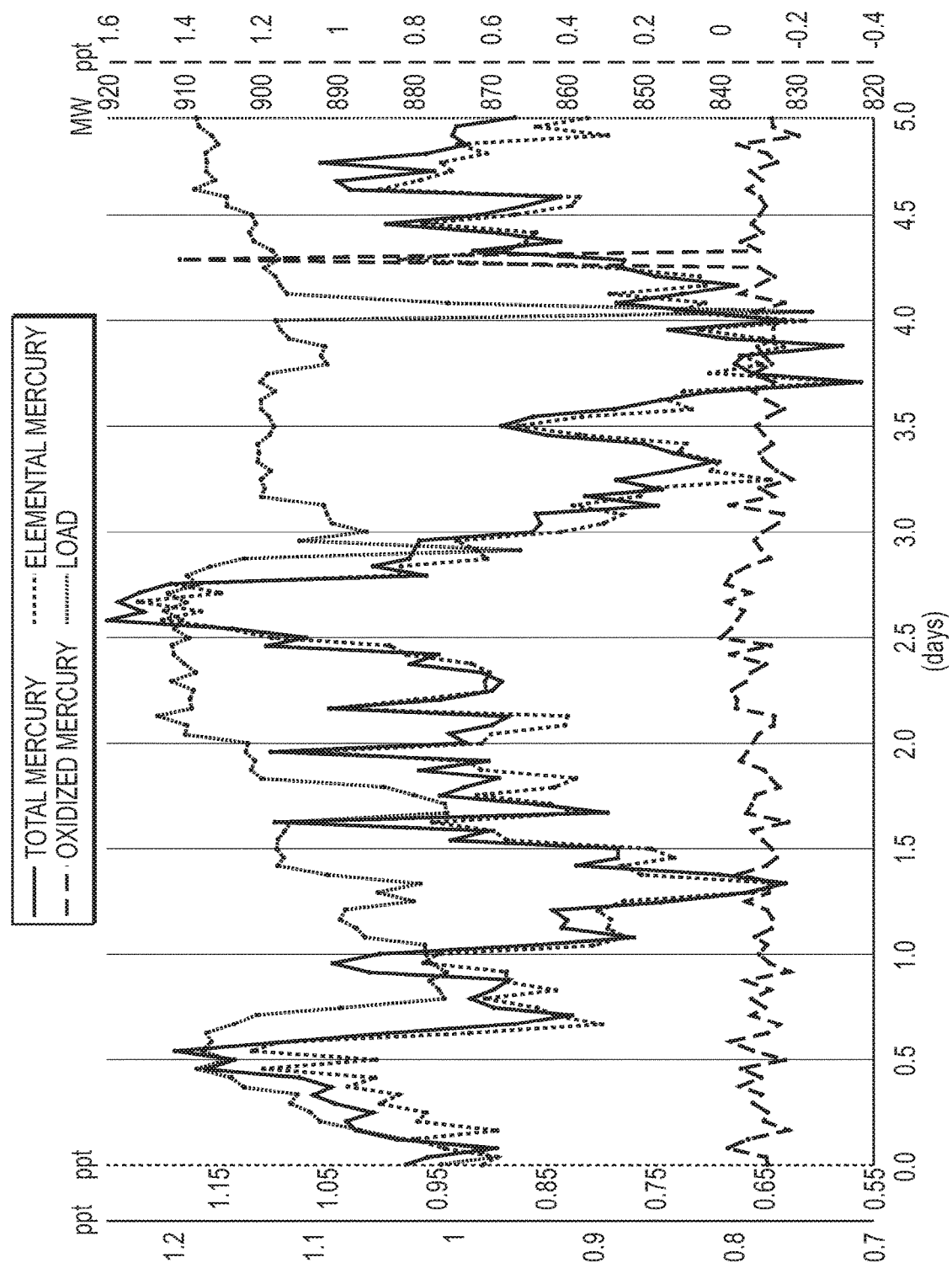
FIG. 5 is a graph showing the effect of acetic acid on mercury sequestration.

The effects of acetic acid administration on mercury sequestration are shown in FIG. 5. A buffering additive containing 56 wt % acetic acid was administered periodically (at approximately 0.5 days and 1.5 days) and separately from the alkaline feed slurry. The FGD system maintained a consistent load (averaging around 900 MW) throughout the course of the five-day study. After addition of the buffering additive, the measured amount of total mercury and elemental mercury dropped from as high as 1.20 ppt to as low as 0.65 ppt. It is believed that the achieved reduction in elemental mercury emission was a result of the mercury being bound by the acetic acid and thus not being available for reduction. It was further demonstrated that, by treating with acetic acid, the total amount of mercury in the flue gas outlet can be reduced by more than 50%.

In sum, when used in the system and method of the disclosed embodiments as described above, acetic acid efficiently buffers the system even when used in significantly lower concentrations than other organic acids, particularly when added separately from the alkaline feed slurry. Acetic acid diffuses more readily, has a greater buffering capacity, and inhibits mercury re-emission. Accordingly, the disclosed system and method provide a significant and unexpected combination of improvements in comparison to conventional FGD buffering techniques.

Although only a few embodiments have been described in detail above, those skilled in the art will readily appreciate that many modifications are possible without materially departing from the disclosed embodiments. Accordingly, all such modifications are intended to be included within the scope of this disclosure as defined in the following claims.

What is claimed is:

1. A flue gas desulfurization system comprising:
    an absorber in which flue gas is scrubbed of sulfur dioxide by reacting the flue gas with an alkaline reactant feed, which includes an alkaline compound, to generate desulfurized flue gas and sump;
    a reaction tank that collects the sump;
    an oxidation air system configured to supply oxygen to the sump;
    an alkaline slurry feed that supplies an alkaline slurry containing the alkaline compound to the sump;
    a recycle feed that transports at least a portion of the sump to the absorber as the alkaline reactant feed; and
    a buffering additive feed that directly adds a buffering additive that includes acetic acid to either the sump or to a stream of the system that is downstream of the sump and before the recycle feed enters the absorber.

2. The system of claim 1, wherein the buffering additive feed directly adds the buffering additive to the sump separately from the alkaline slurry feed.

3. The system of claim 1, wherein the buffering additive feed directly adds the buffering additive to the recycle feed.

4. A method for performing flue gas desulfurization, the method comprising:
    reacting an alkaline reactant feed that includes an alkaline compound with flue gas containing sulfur dioxide to generate desulfurized flue gas and sump, the sump containing at least one of sulfates and sulfites;
    supplying oxygen to the sump;
    adding an alkaline feed slurry to the sump, the alkaline feed slurry containing at least one of lime and limestone in water;
    separating at least a portion of the sump into an underflow containing large solids, and an overflow containing liquid and fine solids; and
    adding a buffering additive to either the sump or the overflow, the buffering additive containing acetic acid, wherein the overflow is supplied as at least part of the alkaline reactant feed reacted with the flue gas containing sulfur dioxide.

5. The method of claim 4, wherein the buffering additive is added to the sump separately from the alkaline feed slurry.

6. The method of claim 5, wherein the sump contains at least 5 wt % of solids.

7. The method of claim 4, wherein the buffering additive is added to the overflow.

8. The method of claim 7, wherein the overflow contains at least 0.1 wt % of solids.

9. The method of claim 4, wherein the alkaline feed slurry contains lime in water.

10. The method of claim 4, wherein the alkaline feed slurry contains limestone in water.

11. The method of claim 4, wherein the underflow and the overflow are separated by centrifugation.

12. A method for performing flue gas desulfurization, the method comprising:
    reacting an alkaline reactant feed including lime and/or limestone with flue gas containing sulfur dioxide to generate desulfurized flue gas and sump, the sump containing reactant products including at least one of sulfates and sulfites;
    supplying oxygen to the sump;
    adding an alkaline feed slurry to the sump, the alkaline feed slurry containing at least one of lime and limestone in water; and
    adding a buffering additive to the sump separately from the alkaline feed slurry, the buffering additive containing acetic acid.

13. The method of claim 12, wherein the sump contains at least 5 wt % of solids.

14. The method of claim 12, wherein the flue gas contains mercury.

* * * * *